June 6, 1961 R. DESCARRIES 2,986,757
MOTOR DRIVEN ROTARY MACHINE
Filed Oct. 16, 1959 3 Sheets-Sheet 1

INVENTOR.
Raymond Descarries
BY
his ATTORNEY

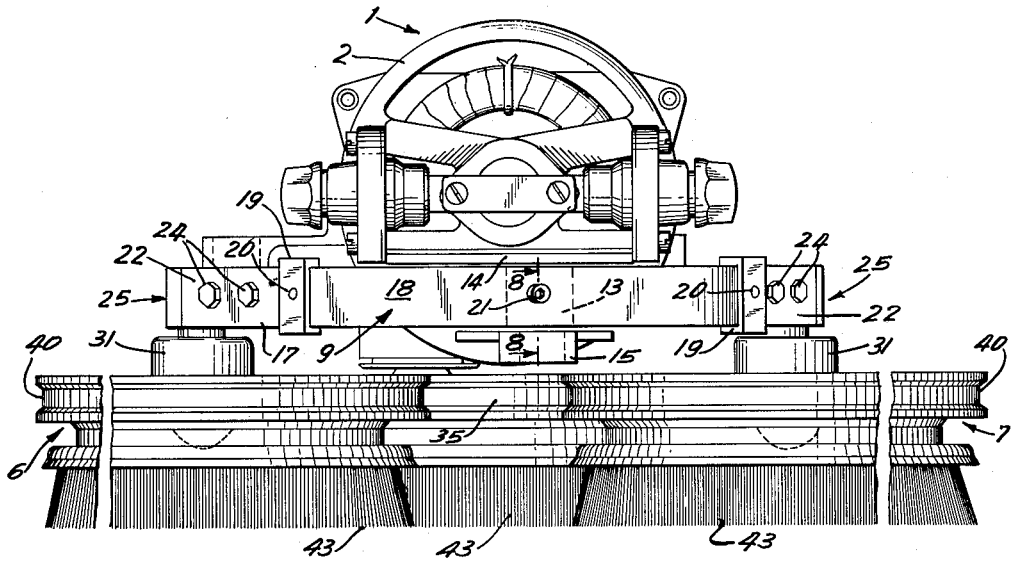
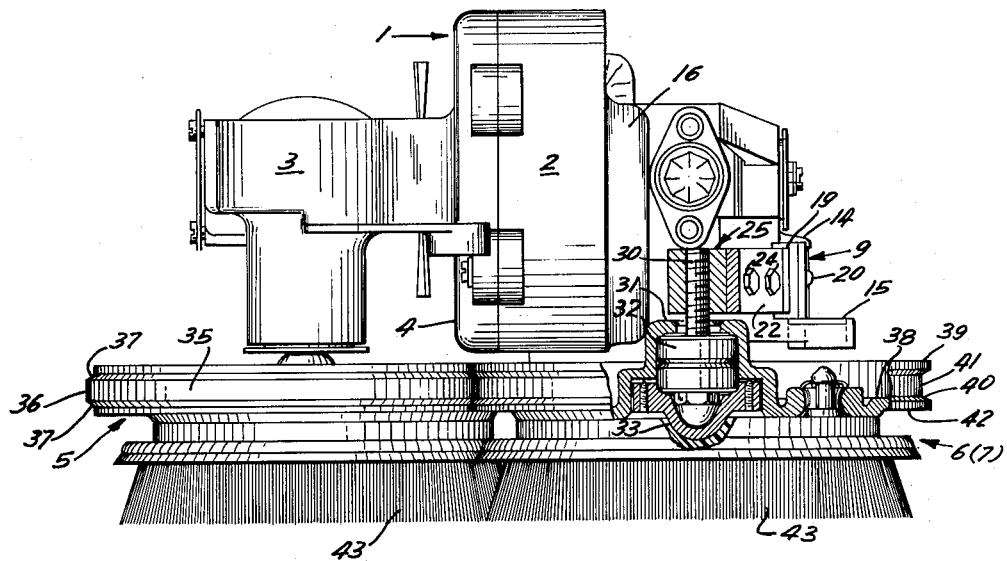

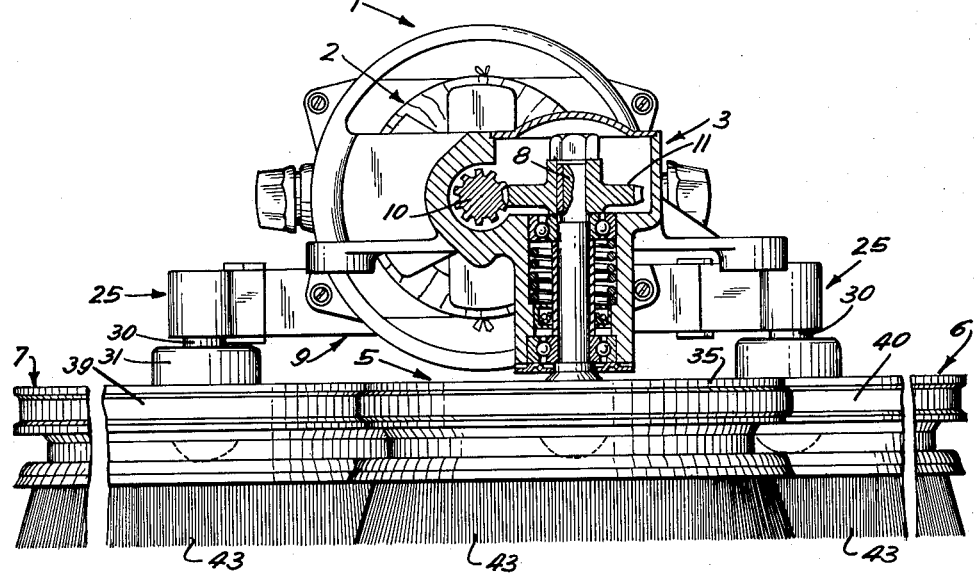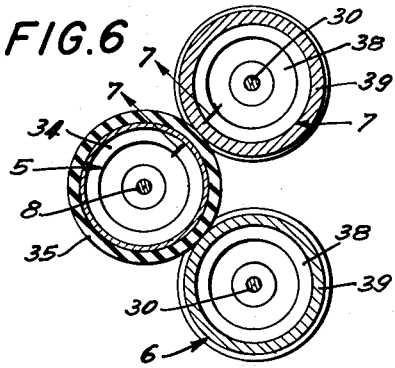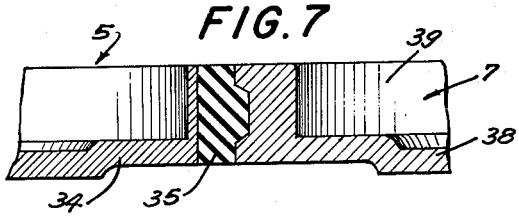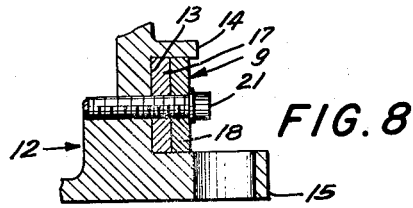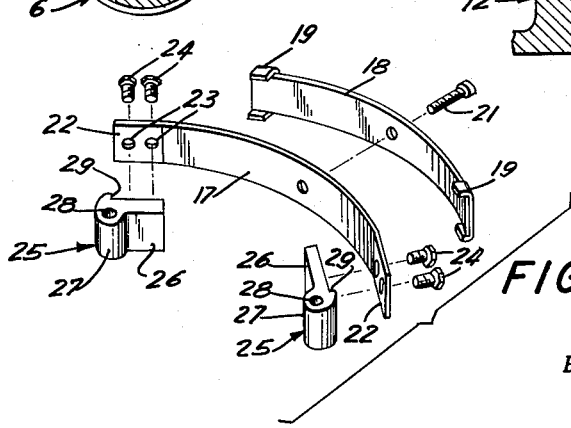

United States Patent Office 2,986,757
Patented June 6, 1961

1

2,986,757
MOTOR DRIVEN ROTARY MACHINE
Raymond Descarries, Montreal, Quebec, Canada, assignor to Aktiebolaget Electrolux, Stockholm, Sweden, a corporation of Sweden
Filed Oct. 16, 1959, Ser. No. 846,838
8 Claims. (Cl. 15—49)

This invention relates to motor driven machines of the type comprising a plurality of rotary members with one rotary member being motor driven and the others rotated by frictional contact with the driven member. The invention has particular application to floor machines and the like having a plurality of rotary working elements.

Floor machines comprising an electrical motor driving unit and plural rotary brushes or the like driven therefrom are well known. It is also conventional to construct multiple brush floor machines in such fashion that the electric motor drives only one of the brushes, the others being driven from the powered brush by any of several types of motion transfer devices. Since it is desirable that machines of this type be very compact, rugged and of relatively simple construction, it is advantageous to so design the machine that the motor driven rotary brush turns the other brushes through direct frictional contact. However, such an arrangement presents certain inherent difficulties because of the problem of assuring good frictional contact between the several rotary members.

A general object of the present invention is to devise a motor driven machine of the type described wherein a good frictional driving relation is obtained without the use of complicated framing and mounting means.

Another object is to devise such a machine wherein the frictionally driven rotary members are wholly supported and positioned by a simple and effective leaf spring arrangement secured directly to the power unit of the machine.

A further object is to provide a floor machine of the type described which is relatively inexpensive to manufacture, easy to assemble and which will be free from mechanical difficulties over long periods of use.

In order that the manner in which these and other objects are attained in accordance with the invention can be understood in detail, reference is had to the accompanying drawings, which form a part of this specification, and wherein:

FIG. 3 is a rear elevational view of the device of FIG. 1;

FIG. 4 is a side elevational view of the same, with some parts broken away;

FIG. 5 is a front elevational view of the device of FIG. 1 with some parts broken away;

FIG. 6 is a semi-diagrammatic view illustrating the relationship of the three rotary brush elements of the device of FIG. 1;

FIG. 7 is a detail sectional view taken on line 7—7, FIG. 6;

FIG. 8 is a detail sectional view taken on line 8—8, FIG. 3;

FIG. 9 is an exploded perspective view of the leaf spring assembly employed to mount two of the rotary working elements of the device of FIG. 1.

Figure 1:
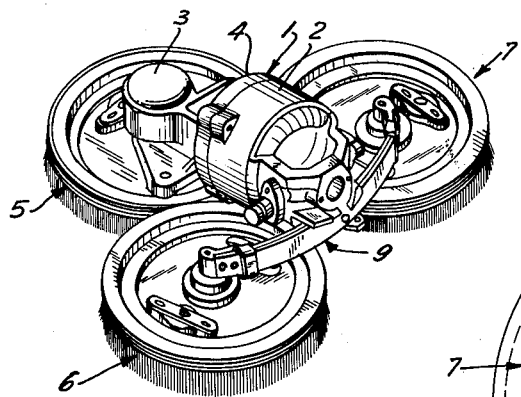
FIG. 1 is a perspective view of the power unit and rotary brush assembly of a floor machine constructed in accordance with one embodiment of the invention.

Turning now to the drawings in detail, it will be seen that the embodiment of the invention here illustrated comprises a power unit indicated generally at 1 and including an electric motor 2 and a gear box 3, the casing of the gear box being formed as an integral part of end bell 4 of the motor housing so that the motor and gear box are combined in a single rigid unit. In this embodiment, the floor machine employs three rotary brush units 5, 6 and 7, unit 5 being supported and driven by the vertical output shaft 8 of gear box 3, and units 6 and 7 being carried by a leaf spring assembly 9 secured to the power unit 1 and operative to urge units 6 and 7 resiliently into frictional driving contact with unit 5.

Figure 2:
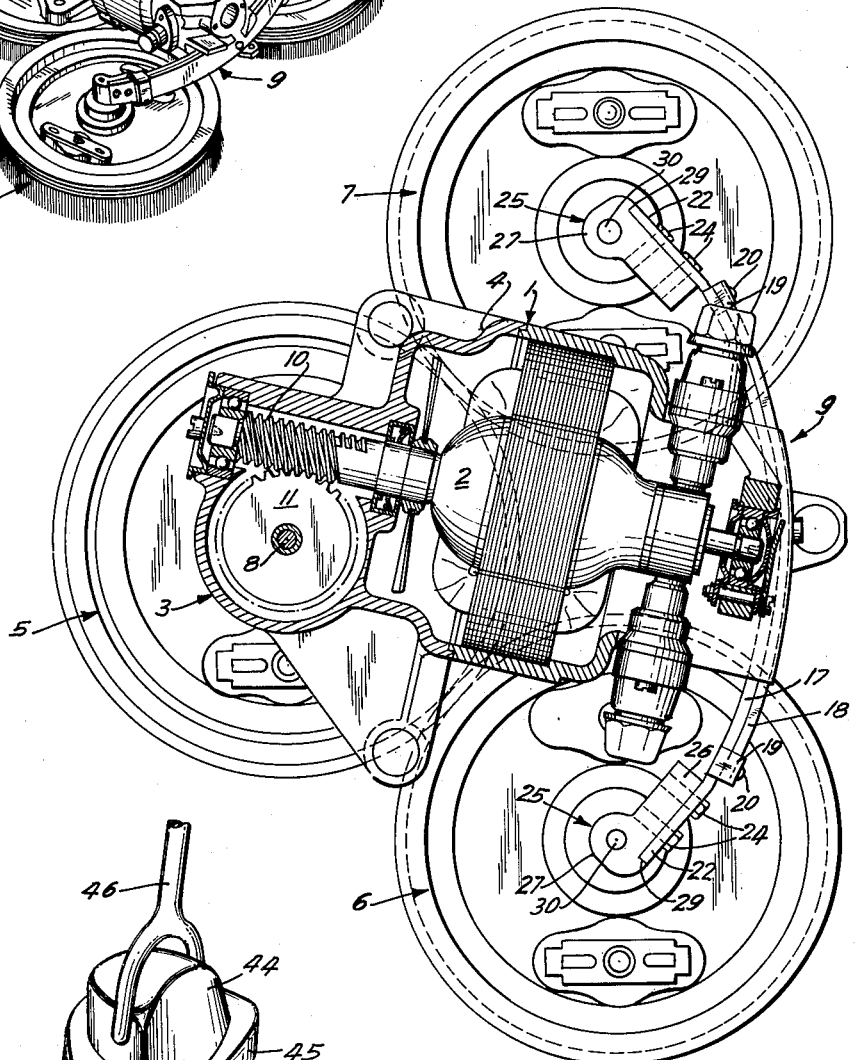
FIG. 2 is a top plan view of the device of FIG. 1, with some parts broken away for clarity of illustration.

As will be clear from FIG. 2, the electrical motor 2 is of conventional construction, the shaft thereof being operatively connected to the worm 10 of gear box 3. Output shaft 8 of the gear box is driven by a worm gear 11, as is well known in the art.

At its end opposite gear box 3, the casing of motor 2 is provided with a rigid portion 12 including an arcuate vertically disposed wall portion 13, FIG. 8, located below the motor shaft and disposed between an upper horizontal flange 14 and a lower horizontal projection 15, FIGS. 3 and 4. Advantageously, rigid portion 12 forms part of a single casting 16 constituting the main portion of the motor housing and including, as integrally formed elements, the wall portion 13, flange 14 and projection 15.

As will be best understood from FIGS. 1 and 9, the leaf spring assembly 9 includes a relatively longer arcuate spring leaf 17 and a shorter arcuate spring leaf 18, the latter being provided with two U-shaped positioning clips 19 attached each at a different end of spring leaf 18. Each clip 19 is rigidly secured to spring leaf 18, as by a rivet 20, FIGS. 2 and 3, the base of the U of the clip extending transversely across the convex or outer surface of the spring leaf and the legs of the U of the clip projecting across the side edges of the spring leaf and being longer than the thickness of the leaf. The radius of curvature of the shorter leaf 18 is smaller than that of the longer leaf 17. The two leaves are nested together and secured between flange 14 and projection 15 by means of a screw 21 threaded into a suitable horizontal bore in wall portion 13, screw 21 being effective to force the two spring leaves together in face-to-face contact so that the spring leaves 17 and 18 jointly assume a curvature matching that of the outer face of wall portion 13 to which they are secured. When the two spring leaves are so assembled, the legs of the U of each clip 19 embrace the corresponding portions of leaf 17.

Longer spring leaf 17 has two straight end portions 22 each provided with a pair of spaced openings 23. Each end portion 22 is angularly offset from the normal arcuate plane of spring leaf 17 in a direction toward the center of curvature of the spring leaf. Secured to each such end portion, as by screws 24 extending through openings 23, is a mounting block 25. Each mounting block 25 includes a flat portion 26 disposed in face-to-face contact with the corresponding end portion 22 of spring leaf 17. Each block 25 also includes a generally cylindrical upright portion 27 provided with an upright, threaded bore 28, the size and position of portion 27 being such as to provide a shoulder 29 at the juncture between cylindrical portion 27 and flat portion 26, such shoulder engaging the corresponding end edge of spring leaf 17.

Rotary brush units 6 and 7 each comprise a fixed upright mounting shaft 30, FIG. 4, having a threaded upper end engaged in the threaded bore 28 of one of the mounting blocks 25. Brush units 6 and 7 each include a centrally disposed, cylindrical hub portion 31 operatively associated with a rotary anti-friction bearing 32 carried by shaft 30, the lower end of hub portion 31 being closed by an end cap 33 in any suitable fashion.

Rotary brush unit 5 has a circular main body 34 provided with a peripherally disposed frictional driving element 35 which, as seen in FIGS. 4 and 5, has a cylindrical periphery 36 and angularly disposed sides 37, so that driving element 35 can be said to have the same transverse cross sectional configuration commonly employed for V-belts. Frictional driving element 35 is advantageously fabricated of rubber or other conventional material having good frictional characteristics and long life.

Rotary brush units 6 and 7 are of identical construction, each comprising a circular main body 38, the peripheral portion 39 of which is provided with an outwardly opening groove 40 having a cylindrical bottom wall and angularly disposed side walls 42, the transverse cross sectional configuration and dimensions of groove 40 being such that the groove will snugly receive frictional driving element 35, in the manner illustrated in FIG. 7, when brush units 6 and 7 are shifted toward brush unit 5.

Considering the effective diameters of the three brush units, the spacing between shaft 8 and the outer surface of wall 13, and the effective length of leaf spring assembly 9, the normal or undistorted configuration of the leaf spring assembly, when mounted as hereinbefore described, is such that the leaf spring assembly is effective to urge grooves 40 of main bodies 38 of brush units 6 and 7 into firm frictional engagement with drive element 35 of brush unit 5. Thus, viewing FIG. 2, and assuming that brush unit 5 is removed from the device, the normal or relaxed position then assumed by the leaf spring assembly 9 would be such as to position brush units 6 and 7 more to the left, by a material amount, than is illustrated.

Leaves 17 and 18 are fabricated of relatively heavy spring steel and are capable of retaining their normal configuration over very prolonged periods. Hence, the leaf spring assembly 9, in the combination hereinbefore described, is, for all intents and purposes, effective to assure that good frictional driving relationship will be maintained between brush unit 5 and units 6 and 7 throughout the life of the machine. On the other hand, it will be obvious that the brush units 6 and 7 can be quickly removed, when it is desirable to disassemble the device, by removing end caps 33 and unscrewing shafts 30.

Brush units 5—7 are otherwise conventionally constructed, and can be provided with the usual brushes indicated at 43 or with any other type of working elements.

Figure 10:
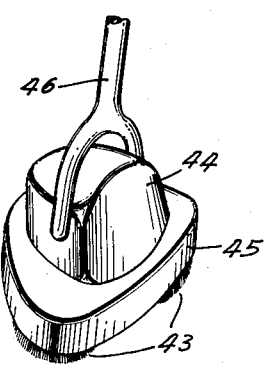
FIG. 10 is a perspective view of a portion of a completed floor machine embodying the device of FIG. 1.

As seen in FIG. 10, the device illustrated in FIGS. 1-9 can be embodied in a completed floor machine comprising the usual main housing 44 for the power unit and lower housing 45 to enclose the upper portion of the brush units, a manipulating handle 46 being pivotally attached to housing 44 in any conventional fashion.

Referring to FIG. 2, it will be noted that the vertical axes of rotation of the brush units 5—7 are disposed respectively at the apices of a triangle. Brush units 6 and 7 being identical, such triangle is an isosceles triangle, the spacing between the axis of rotation of unit 5 and unit 6 being the same as that between the axes of rotation of unit 5 and unit 7. It will be understood that the vertical position of output shaft 8 is fixed by the combination of dependent cylindrical portion 47 of the gear box housing and bearings 48, as seen in FIG. 5. It will also be understood that the position of the midpoint of leaf spring assembly 9 is fixed because wall portion 13 is a rigid part of the motor housing and the leaf spring assembly is mounted rigidly by screw 21. Accordingly, the midpoint of the leaf spring assembly 9 and the vertical axis of rotation of brush unit 5 are spaced by a fixed distance along a line equidistant from the axes of rotation of brush units 6 and 7 and the proper frictional drive relationship will be maintained so long as the leaf springs retain their normal strength.

Referring again to FIG. 2, it will be noted that the axis of the motor shaft is offset angularly with respect to a line drawn between the midpoint of the leaf spring assembly and the axis of rotation of brush unit 5. Such arrangement makes possible the use of the compact and simple worm drive illustrated.

What is claimed is:

1. In a machine of the type described, the combination of a power unit having an output shaft mounted for rotation about a fixed upright axis, rigid means forming a part of said power unit and including a fixed mounting portion spaced laterally from said output shaft, a first rotary work member mounted on said shaft for rotation thereby, said work member having a circular peripheral portion lying in a plane at right angles to said upright axis, leaf spring means secured intermediate its ends to said mounting portion, and second and third rotary work members arranged for free rotation each about an upright axis parallel to said fixed upright axis of said output shaft and each having a circular peripheral portion lying in a plane at right angles to its axis of rotation, said second and third rotary work members each being mounted on a different end portion of said leaf spring means and said leaf spring means being effective to maintain said second and third rotary work members resiliently in peripheral, frictional, driving engagement with said first rotary work member.

2. In a floor machine, the combination of a power unit having an output shaft mounted for rotation about a fixed upright axis, said power unit having a rigid casing including a fixed mounting portion spaced laterally from said output shaft, a first rotary work element carrier mounted on said shaft for rotation thereby, said carrier having a circular peripheral portion lying in a plane at right angles to said upright axis; leaf spring means secured at its midpoint to said mounting portion, and second and third rotary work element carriers arranged for free rotation each about an upright axis parallel to the axis of said output shaft and each having a circular peripheral portion lying in a plane at right angles to its axis of rotation, said second and third rotary work element carriers each being mounted on a different end portion of said leaf spring means and said leaf spring means being effective to maintain said second and third rotary work element carriers resiliently in peripheral, frictional, driving engagement with said first rotary work element carrier.

3. A floor machine in accordance with claim 2 and comprising a pair of mounting blocks each fixed to a different end of said leaf spring means, each of said mounting blocks being provided with an upright threaded bore, said second and third rotary work element carriers each being provided with a threaded supporting shaft, each such supporting shaft being engaged in a different one of said bores.

4. In a floor machine, the combination of a power unit having an output shaft mounted for rotation about a fixed vertical axis, said power unit having a rigid casing including a fixed vertical surface spaced laterally from said fixed vertical axis; a leaf spring fixed at its midpoint to said vertical surface; first, second and third rotary work element carriers each having a circular peripheral portion, said peripheral portions being disposed in a horizontal plane below said power unit, said first work element carrier being mounted on said output shaft for rotation thereby, said second and third work element carriers each being mounted on a different end portion of said leaf spring each for rotation about an axis parallel to the axis of said output shaft, and said leaf spring being operative to maintain said rotary work element carriers resiliently in peripheral friction drive engagement.

5. A floor machine in accordance with claim 4 and wherein one of said work element carriers is provided with a peripheral rim of frictional material, the others of said work element carriers each having a peripheral groove of configuration to operatively receive said rim.

6. A floor machine in accordance with claim 4 and wherein said leaf spring comprises at least one arcuate spring leaf curving toward said output shaft, said fixed vertical surface is an arcuate surface, and said spring leaf is secured in face-to-face contact with said surface.

7. A floor machine in accordance with claim 6 and comprising a pair of mounting blocks each rigidly secured to a different end portion of said spring leaf, each of said mounting blocks being provided with a vertical threaded bore, said second and third work element carriers each being rotatably mounted on and wholly supported by a threaded shaft engaged in a different one of said bores.

8. In a floor machine, an electrical motor having a rigid casing and a horizontally disposed shaft; gearing comprising an output shaft rotated by said motor about a fixed vertical axis, said gearing including a rigid housing fixed to said motor casing; a horizontally extending leaf spring fixed intermediate its ends to said motor casing at a point spaced laterally from said fixed vertical axis; first, second and third rotary work element carriers each having a circular peripheral portion, said peripheral portions lying in a common horizontal plane below said motor, gearing and leaf spring, said first work element carrier being mounted on said output shaft for rotation thereby, said second and third work element carriers each being mounted for free rotation about a different vertical shaft each depending from a different end portion of said leaf spring, and said leaf spring being operative to maintain said second and third work element carriers resiliently in peripheral, frictional driving engagement with said first rotary work element carrier.

References Cited in the file of this patent

UNITED STATES PATENTS 2,258,165    Sassano  ---------------- Oct. 7, 1941

FOREIGN PATENTS 636,274    Great Britain ---------- Oct. 14, 1947